United States Patent Office

3,076,850
Patented Feb. 5, 1963

3,076,850
PROCESS FOR PREPARING ORTHO-SEC-ALKYL THIOPHENOLS USING $BF_3$-$H_3PO_4$ COMPLEX AS CATALYST
Martin B. Neuworth, Pittsburgh, Pa., assignor to Consolidation Coal Company, Pittsburgh, Pa., a corporation of Pennsylvania
No Drawing. Filed Nov. 21, 1960, Ser. No. 70,425
8 Claims. (Cl. 260—609)

This invention relates to alkylated thiophenols and processes for preparing them. More particularly, it relates to a process whereby ortho-alkyl thiophenols are prepared by direct nuclear alkylation of a thiophenol in the presence of boron trifluoride-phosphoric acid complex as catalyst.

The problems involved in the direct alkylation of thiophenols are well known. As has been pointed out in U.S. Patent 2,753,378:

"In contrast with phenolic compounds which are simply alkylated to produce alkyl phenols, previous effects to alkylate thiophenols have resulted in alkylation exclusively of the sulfur atom with resulting production of aryl alkyl sulfides. Since efforts to effect carbon alkylation of thiophenols in the past have resulted in the production of aryl alkyl sulfides, it has been necessary to resort to means such as zinc dust reduction of alkyl benzene sulfonyl chlorides, the reaction of diazotized alkaryl amines with hydrogen sulfide, catalytic hydrogenation of aryl sulfonic acids and the action of sulfur on Grignard reagents in order to produce alkyl-substituted thiophenols. In addition to the tendency towards thioether formation, attempted alkylation of thiophenols has also been complicated by the fact that common alkylating catalysts such as anhydrous aluminum chloride and concentrated sulfuric acids have tended to cause desulfurization and condensed ring formation at relatively mild operating conditions."

It has been reported in the prior art that thiophenols, including ortho- and meta-substituted alkyl thiophenols, can be directly alkylated in the para position by using a combination of a specific alkylating agent, namely, either a tertiary aliphatic alcohol or a tertiary aliphatic mercaptan, together with a specific catalyst, namely, an aluminum halide catalyst, e.g., aluminum chloride, Primary and secondary alcohols are considered unsuitable as alkylating agents in that sulfur-alkylated products are reported to be produced exclusively.

Relatively little information is available in the chemical literature with respect to the preparation of orthosubstituted alkyl thiophenols. None of this information relates to the direct nuclear alkylation of thiophenols in the ortho position. Heretofore, to obtain o-alkyl thiophenols, other than o-thiocresol and possibly o-ethylthiophenol, relatively expensive and involved techniques were required, which made the processes of little or no commercial interest. In one such method, the corresponding o-alkyl analine derivative is converted to the o-alkyl thiophenol by the relatively elaborate Leukart synthesis. In another method, the o-alkyl benzene sulfonyl chloride is converted to the o-alkyl thiophenol by a standard acid-metal reduction. The preparation of the starting materials for these reactions is further frequently involved and expensive.

Accordingly, it is an object of the present invention to provide a method, free from the disadvantages of known methods, for directly alkylating a thiophenol in the ortho position of the ring.

It is an additional object to provide orthoalkylated thiophenols.

It is still a further object to provide orthosubstituted alkylated thiophenols in high yield by utilizing the process of this invention in conjunction with thioether cleavage techniques.

This invention involves the discovery that o-alkyl thiophenols may be produced in substantial yield by direct nuclear alkylation of thiophenol and its homologs with a selected secondary alkyl-generating olefin in the presence of boron trifluoride-phosphoric acid complex under prescribed alkylating conditions. This invention provides means for producing ortho-substituted alkyl thiophenols by a direct nuclear alkylation process which is adaptable to commercial exploitation.

Under selected ring-alkylating conditions, t-alkyl-generating olefins, e.g., isobutylene, can be made to nuclearly alkylate a thiophenol. However, the t-alkyl group will substitute in the para position only. If this position is blocked, ortho substitution will not take place; only sulfides, i.e., thioethers will be formed.

In accordance with this invention, an alkylatable thiophenol containing an ortho position that is "free," i.e., unsubstituted by other than a hydrogen atom, is converted to an o-alkyl thiophenol in substantial yield by reacting it with a secondary alkyl-generating olefin under ring alkylating conditions in the presence of boron trifluoride-phosphoric acid complex as catalyst so that there occurs substantial substitution by the secondary alkyl group in the ortho position. Further, in accordance with this invention, it is also possible to obtain nuclear dialkylation in the event that both ortho positions are unsubstituted.

In addition to ortho-substituted mono and dialkyl thiophenols, S-alkyl thiophenols are also obtained. These sulfides or thioethers may be quantitatively converted to the corresponding thiophenols using a sulfide-cleavage technique. The product distribution obtained by the alkylation is determined by the selection of the thiophenol, the olefin, and the specific reaction conditions. The use of low temperatures is particularly favored.

Suitable alkylating agents include non-branched olefins, e.g., propylene and cyclopentene. The propylation reaction generally gives highest yields, with higher olefins giving lower yields of ortho-substituted ring-alkylated products. In general, non-terminal linear olefins, e.g., 2-butene, give poorer results than their terminal isomers, e.g., 1-butene. It is noted that the by-product sulfides cannot be isomerized by further reaction in the presence of boron trifluoride-phosphoric acid complex. This isomerization technique is effectively used for converting tertiary S-alkyl thiophenols to corresponding para-alkylated thiophenols. However, the sulfides formed in the present process may be quantitatively converted to the corresponding starting thiophenol or o-alkyl thiophenol by using any of various thioether cleavage techniques, e.g., reaction in the presence of either sodium metal in liquid ammonia, alumina-silica, or solid phosphoric acid. Effectively, then, in accordance with this invention, total conversion of a thiophenol to a nuclearly substituted ortho-alkylated product may be obtained by combining the process of this invention of direct nuclear alkylation in the ortho position with subsequent sulfide cleavage.

Specific sulfide cleavage processes are disclosed and claimed in the following copending applications: M. D. Kulik and M. B. Neuworth, S.N. 94,164; R. J. Laufer, S.N. 94,163; and R. J. Laufer and M. B. Neuworth, S.N. 94,161; all filed March 8, 1961, and assigned to the assignee of the present application.

The terms "alkylation" or "alkylating" as used herein, unless otherwise indicated, are directed to the substitution of a primary or secondary alkyl hydrocarbon radical for a hydrogen atom in one or more ortho positions of a thiophenolic compound. The term "C-alkylation" is specific to substitution in the ring, and "S-alkylation" refers to substitution of the hydrogen atom attached to the sulfur atom to form an alkyl aryl sulfide, i.e., a thioether.

The alkylatable thiophenolic compounds that are employed as starting materials in the process of this invention contain a hydrogen atom in at least one ortho position. Alkyl substituents may be present on the remaining ring positions. Problems of steric hindrance, which ordinarily occur when an attempt is made to substitute a group onto the ring in a position adjacent to another group already on the ring, are of relatively minor importance compared with similar problems which occur under conditions of para alkylation. Thus, propylation of m-thiocresol can yield significant amounts of both possible ortho mono-isopropyl derivatives as well as of the 2,6-diisopropyl derivative, whereas t-butylation of m-thiocresol is not feasible using isobutylene.

Thiophenol homologs that may be advantageously employed in the process of this invention include, for example, o-thiocresol, m-thiocresol, p-thiocresol, m-ethylthiophenol, 2,3-, 2,4-, 2,5-, 3,4-, and 3,5-thioxylenols, 4-t-butylthiophenol, and 4-t-butyl-o-thiocresol. In general, thiophenol, itself and thiophenol substituted only by lower alkyl radicals ($C_1$ to $C_5$ are preferred as alkylatable starting materials. These preferred alkylatable thiophenols are unsubstituted by other than hydrogen in either or both ortho positions on the ring.

In general, secondary alkyl-generating unsaturated aliphatic hydrocarbons having from 3 to 12 carbon atoms, e.g., various olefins and olefin polymers, are suitable and preferred for the practice of this invention. Particularly useful are $C_2$ to $C_5$ olefins. As the molecular weight of the olefin employed increases, yields of ortho-substituted ring-alkylated product decrease. Suitable alkylating agents that may be used for obtaining substitution in the ortho position of the ring include propylene, 1-butene, 2-butene, 1-pentene, and cyclopentene.

It is considered an essential feature of this invention that boron trifluoride-phosphoric acid complex be used as catalyst together with a secondary alkyl-generating olefin to effect the direct nuclear alkylation of the thiophenol in the ortho position. The catalyst of this invention is essentially an equimolar reaction product of boron trifluporide and phosphoric acid. This product is a clear, amber-colored liquid.

For obtaining ortho-substitution of a secondary alkyl group into the ring of a thiophenol, so-called conventional alkylation catalysts are not substitutive for each other. Thus, catalysts which are effective in a Friedel-Crafts reaction with respect to ring-alkylating phenols, e.g., zinc chloride, antimony trichloride, sulfuric acid, phosphoric acid, and ferric chloride, are essentially ineffective for the ring alkylation of thiophenols in either the ortho or para position.

Temperatures between about $-50$ and $+50°$ C. may be successfully employed in the practice of this invention. The use of temperatures below 25° C. is preferred to minimize sulfide formation. Where reaction rate considerations permit, temperatures between $-25$ and $-50°$ C. are considered particularly effective for obtaining maximum nuclear alkylation. At temperatures between 75 and 100° C., which are considered optimal for para alkylation, little or no ortho alkylation is obtained. An amount of 5 to 10 percent of catalyst, based on the original weight of the thiophenol, is generally preferred for obtaining optimum yields. However, amounts of catalyst between 3 and 25 percent by weight are considered suitable depending upon specific reaction conditions.

Because of the relatively rapid rate of the ortho alkylation reaction and the low temperatures at which it is preferably carried out, degradation of the thiophenol by the catalyst is not a serious problem. However, the catalyst of this invention is unique in that it does not detectably degrade the thiophenol itself even at relatively elevated temperatures.

A catalyst of this invention is essentially an equimolar complex of boron trifluoride and phosphoric acid. As pointed out in my joint copending application, Serial No. 70,424, filed of even date herewith, boron trifluoride is a catalyst that may be used to effect the ring alkylation of thiophenols in the ortho position. On the other hand, phosphoric acid is wholly ineffectual in this regard, no C-alkylation occurring. However, the catalyst used herein, namely, boron trifluoride-phosphoric acid complex, has been found to be significantly more effective than either boron trifluoride (or phosphoric acid) in giving a much more complete alkylation in the ortho position of the ring in a single pass of reactants through the system. At the same time, the high pressures required for effective use of gaseous boron trifluoride are not required for use with the boron trifluoride-phosphoric acid complex because of its liquid nature.

In addition, the catalyst used herein is insoluble in the alkylated thiophenol reaction products, and therefore may be readily recovered from the system by simple decantation and effectively reused. Reuse of boron trifluoride is ordinarily impracticable because recovery of the gas from a pressurized system is difficult, and separation of the gas from other evolved gases may be required. Recovery of other catalysts, e.g., aluminum chloride, from the reactant system is not feasible because of their ready solubility in the thiophenols. As a consequence, a catalyst such as aluminum chloride ordinarily is destroyed during the subsequent hydrolysis step and therefore cannot be recovered for reuse. Thus the catalyst of this invention is uniquely adapted to the alkylation of thiophenols in the ortho position of the ring because of its high activity in effecting ring alkylation in the ortho position, the absence of high pressure requirements and its ready recovery and reuse.

The catalyst of this invention when prepared from 85 percent phosphoric acid, i.e., containing 15 weight percent water, the phosphoric acid of commerce, will effectively promote ring alkylation of a thiophenol. However, it has been uniquely found that superior results are obtained in the ring alkylation of a thiophenol when the catalyst is prepared starting with 100 percent phosphoric acid. Using this latter catalyst, considerably higher yields of ring-alkylated thiophenol are obtained.

The liquid catalyst used in the practice of this invention may be prepared by various methods known to the art. Thus the catalyst may be conveniently prepared by bubbling boron trifluoride gas through 100 percent phosphoric acid. An equimolar complex results which begins to decompose at temperatures above 120° C. If a deficiency of boron trifluoride gas is used, then free phosphoric acid is associated with the catalyst complex. If an excess of boron trifluoride gas is added, under pressurized conditions, the gas will go into solution in the complex, and subsequently be evolved from the liquid upon release of pressure. If 85 percent phosphoric acid is used, water will be present in the final complex.

The process disclosed herein is particularly advantageous for commercial exploitation inasmuch as the alkylated thiophenol may be completely converted to the ortho C-alkylate product with no S-alkylate product present. The S-alkylate product formed generally consists of the sec-alkyl aryl sulfide and also of the sec-alkyl o-sec-alkaryl sulfide. The formation of the latter sulfide is favored when a molar excess of alkylating agent is used. Where both ortho positions are initially free, other sulfides will also be formed. In contrast to the isomerization of sulfide, which is effectively used in the para alkylation reaction, in the present process the by-product sulfides are cleaved to form their corresponding thiophenols. This cleavage may be accomplished by reaction of the sulfide with sodium in liquid ammonia or by heating over alumina-silica catalyst or over solid phosphoric acid, e.g., phosphorus pentoxide absorbed on an inert carrier such as kieselguhr, commercially available as UOP No. 2 catalyst.

Without being restricted by the reaction mechanism to be suggested, it is believed that the high ortho selectivity of the reaction, combined with the promoting effect of low reaction temperatures, suggests the involvement of the olefin and the thiophenol in an intermediate complex in the vicinity of the sulfur atom. The effect of low temperatures is apparently to increase the stability of the complex. In contrast to para alkylation, it is believed that little or no nuclear alkylation or migration of the sulfides occurs. Thus recycling of the sulfides in the presence of catalyst is ineffective for increasing the yield of the ortho-alkylated thiophenol because of the absence of isomerization phenomena. It is believed that once all the olefin has been absorbed by the system, the reaction is essentially complete. An increase in reaction time beyond this point should not therefore significantly affect the final product distribution.

Depending upon specific reaction conditions with respect to alkylatable thiophenol, alkylating agent, and temperature, a reaction time of as little as half an hour may be suitable. In general, reaction times between 2 and 3 hours are preferred. Under optimum conditions of temperature and of catalyst concentration, as well as optimum olefin to thiophenol ratio, the reaction is rapidly completed. An increase in the reaction time beyond three hours will then give but little increase in the yield of o-alkyl thiophenol. Apparently, the final product distribution is rapidly attained, even at low temperatures.

The alkylated thiophenols, both C-alkylated and S-alkylated, find a variety of uses. They are particularly useful as substantially odorless rubber peptizers. Several of these compounds or their metallic salts are of interest as lubricating oil additives because of their antioxidant and detergent properties. As antioxidants, they serve to prevent resin formation in fuels; condensed to form thioacetals, they are particularly suited as additives for high pressure lubricating oils; they are also useful as additives for metal cleaners to protect the metal from atmospheric attack; they also protect drying oils, such as linseed oil, from darkening and oxidation; they have also been used to stabilize preparations of adrenalin and other hormones. Various of the S-alkylate compounds are seen as possessing useful insecticidal properties in addition to being useful as ready sources for the production of the corresponding thiophenols.

For purposes of illustration, without limiting its scope, the process of this invention will be particularly described with reference to the conversion of thiophenol to o-sec-butylthiophenol. The following reactions, shown schematically and not stoichiometrically, illustrate the manner in which conversion of thiophenol to o-sec-butylthiophenol may be obtained under preferred reaction conditions.

It is noted that in accordance with the above two reactions, the final product obtained is either a mono- or di-ortho alkylated product, or convertible thereto. These reactions are specifically illustrated in the following examples relating to the alkylation of thiophenol by 1-butene in the presence of boron trifluoride–100% phosphoric acid complex as catalyst:

*Example 1*

ALKYLATION OF THIOPHENOL WITH 1-BUTENE, EMPLOYING $BF_3$—$H_3PO_4$ AS CATALYST

Thiophenol, 4.53 moles, was reacted at 25° C. with 8 moles of 1-butene in the presence of 20% by weight, based on thiophenol, of $BF_3$—$H_3PO_4$ catalyst. The 1-butene was introduced into the thiophenol catalyst mixture at the rate of 2.5 g./min. After introducing all of the olefin, the reaction mixture was held at 20° C. for 2.5 hours.

The following results were obtained.

Conversion of thiophenol: 61.9 mole percent.
Yield: Weight percent
2-sec-butylthiophenol _____ 22.9
Sec-butylphenyl sulfide_____ 15.3
Sec-butyl 2,6-di-sec-butylphenyl sulfide_____ 24.3
Unidentified _____ 37.5

*Example 2*

CLEAVAGE OF SEC-ALKYL ARYL SULFIDE (THIOETHER CLEAVAGE)

(a) *Reduction of isopropyl o-isopropylphenyl sulfide using sodium metal in anhydrous ammonia.*—Isopropyl o-isopropylphenyl sulfide (60.5 g.) was dissolved in 250 milliliters of ammonia maintained at its atmospheric reflux temperature, −33° C. Sodium metal was added in small pieces until an excess was present as determined by a blue coloration of the solution. The addition of sodium occurred over 1½ hours, with reaction of a half hour following the addition. After destruction of excess sodium and evaporation of ammonia, a residual solid was recovered and dissolved in 100 ml. of water. The aqueous solution was washed with ether, acidified, and the product extracted with ether. From the ethereal solution was recovered 38.8 g. o-isopropylthiophenol.

(b) *Reduction of isopropyl 2,6-diisopropylphenyl sulfide using sodium metal in anhydrous ammonia.*—Isopropyl 2,6-diisopropylphenyl sulfide (48 g.) was reacted with sodium metal in anhydrous ammonia as described above. Thirty grams of 2,6-diisopropylthiophenol was finally recovered. This represented complete conversion of the starting sulfide and recovery and product of the yield of 75 percent.

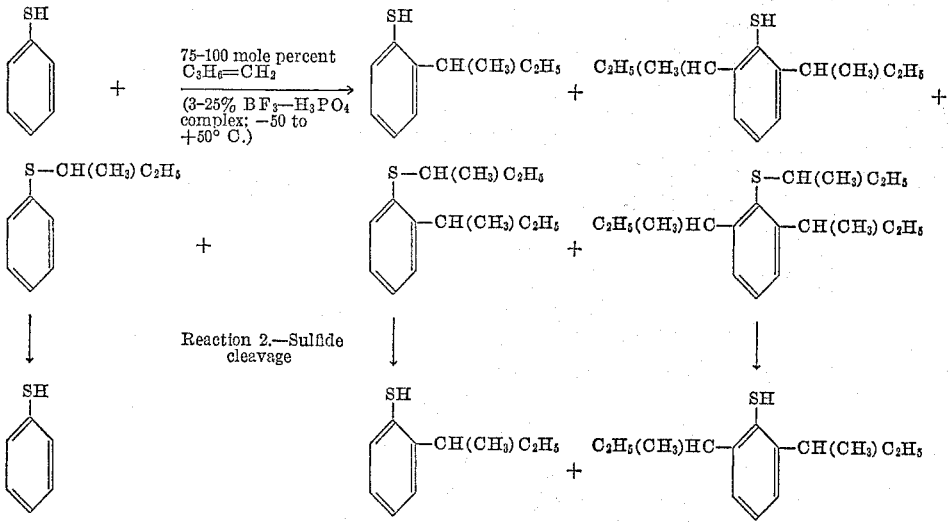

(c) *Cleavage of isopropyl o-isopropylphenyl sulfide using solid phosphoric acid catalyst.*—Isopropyl o-isopropylphenyl sulfide (150 g.) was heated at a temperature between 295 and 325° C. in the presence of 20 g. solid phosphoric acid catalyst and a high boiling paraffin oil. The paraffin oil serves to increase the temperature at which the sulfide may be refluxed, at atmospheric pressure. After reaction for five hours under controlled reflux conditions in a packed column, followed by final removal of pot and column holdup under reduced pressure, a distillate was recovered. This distillate was refractionated to yield the following products:

|  | Weight (grams) | Yield, mole percent (based on 78.5% conversion of sulfide) |
| --- | --- | --- |
| Thiophenol | 7.7 | 11.5 |
| Isopropylphenyl sulfide | 6.0 | 6.5 |
| o-Isopropylthiophenol | 63.1 | 67 |
| p-Isopropylthiophenol | 6.0 | 6.2 |

(d) *Cleavage of isopropyl 2,6-diisopropylphenyl sulfide using solid phosphoric acid as catalyst.*—Isopropyl 2,6-diisopropylphenyl sulfide (139 g.) was heated in the presence of 20 grams of solid phosphoric acid and 140 grams of high boiling paraffin oil essentially as described above. The following products were recovered:

|  | Weight (grams) | Yield, mole percent (based on 79% conversion of initial sulfide) |
| --- | --- | --- |
| Thiophenol | 1.8 | 3.5 |
| Isopropylphenyl sulfide | 0.3 | 0.4 |
| o-Isopropylthiophenol | 9.5 | 13.4 |
| p-Isopropylthiophenol | 2.1 | 3.0 |
| Isopropyl isopropylphenyl sulfide | 6.6 | 7.3 |
| Diisopropylthiophenol [1] | 50.1 | 55.5 |

[1] Major isomer present was 2,6-diisopropylthiophenol.

Obviously many modifications and variations of the invention, as hereinbefore set forth, may be made without departing from the spirit and scope thereof, which are primarily directed to the direct alkylation of an alkylatable thiophenol in the ortho position in the presence of boron trifluoride-phosphoric acid complex as catalyst using a secondary alkyl-generating olefin as alkylating agent. Specific details and procedures given, therefore, should be considered only illustrative of the invention, its scope being determined in accordance with the objects thereof and the appended claims.

I claim:
1. A process of substituting the hydrogen atom in an ortho position of a thiophenol by a secondary alkyl group which comprises alkylating an alkylatable thiophenol containing a hydrogen atom in an ortho position with a monoolefinic hydrocarbon alkylating agent, in which the alkyl substituent formed is a secondary alkyl group, in the presence of boron trifluoride-phosphoric acid complex as catalyst at ring alkylating conditions so that there occurs substantial substitution by the secondary alkyl group in an ortho position in addition to S-alkylation.

2. The process for preparing alkyl thiophenols substituted in an ortho position of the ring which comprises alkylating an alkylatable thiophenol containing a hydrogen atom in an ortho position with a monoolefinic hydrocarbon containing from 3 to 12 carbon atoms and in which the alkyl substituent formed is a secondary alkyl group, in the presence of boron trifluoride-phosphoric acid complex as catalyst at ring alkylating conditions so that there occurs substantial substitution by the secondary alkyl group in an ortho position.

3. The process for preparing alkyl thiophenols alkylated in an ortho position which comprises alkylating a thiophenol selected from the class consisting of thiophenol and lower alkyl-substituted thiophenols having an unsubstituted ortho position on the ring with a monoolefin containing from 3 to 12 carbon atoms and in which the alkyl substituent formed is a secondary alkyl group, in the presence of boron trifluoride-phosphoric acid complex as catalyst at ring alkylating conditions so that there occurs substantial substitution by the secondary alkyl group in an ortho position.

4. The process for preparing o-sec-butyl thiophenols which comprises reacting a thiophenol containing a hydrogen atom in an ortho position with an unbranched monoolefinic butene in the presence of boron trifluoride-phosphoric acid complex as catalyst at alkylating conditions whereby substantial carbon butylation in an ortho position occurs.

5. The process for preparing o-sec-butyl thiophenols which comprises reacting a thiophenol containing a hydrogen atom in an ortho position with an unbranched monoolefinic butene in the presence of from 3 to 25 percent by weight, based on starting thiophenol, of boron trifluoride–100% phosphoric acid complex as catalyst at a temperature between −50 and +50° C. whereby substantial carbon butylation in an ortho position occurs.

6. The process of substituting the hydrogen atom in an ortho position of a thiophenol by a secondary alkyl group and obtaining substantially all C-alkylate product which comprises reacting a thiophenol containing a hydrogen atom in an ortho position with a monoolefin containing from 3 to 12 carbon atoms and in which the alkyl substituent formed is a secondary alkyl group, at ring alkylating conditions in the presence of boron trifluoride-phosphoric acid complex so that the reaction mixture obtained includes substantial amounts of ortho C-alkylate product in addition to S-alkylate products selected from the class consisting of sec-alkyl-o-sec-alkaryl sulfide and sec-alkyl aryl sulfide, and cleaving the S-alkylate products in the presence of a sulfide-cleavage catalyst to form o-sec-alkyl thiophenol and the starting thiophenol as cleavage products from respective S-alkylate products.

7. The process according to claim 6 wherein the regenerated starting thiophenol is recirculated in the system.

8. The process according to claim 6 wherein said monoolefin is an unbranched butene.

References Cited in the file of this patent
UNITED STATES PATENTS

| 2,685,815 | Nickels | Aug. 17, 1954 |
| 2,739,172 | Peters | Mar. 20, 1956 |
| 2,800,451 | Mottern et al. | July 23, 1957 |

UNITED STATES PATENT OFFICE
CERTIFICATE OF CORRECTION

Patent No. 3,076,850                           February 5, 1963

Martin B. Neuworth

It is hereby certified that error appears in the above numbered patent requiring correction and that the said Letters Patent should read as corrected below.

Column 1, line 20, for "effects" read -- efforts --; column 3, line 20, for "($C_1$ to $C_5$ are" read -- ($C_1$ to $C_5$) are --; line 28, for "$C_2$" read -- $C_3$ --; line 40, for "trifluporide" read -- trifluoride --.

Signed and sealed this 24th day of September 1963.

(SEAL)
Attest:

ERNEST W. SWIDER
Attesting Officer

DAVID L. LADD
Commissioner of Patents